United States Patent
Nagai et al.

(10) Patent No.: US 11,993,742 B2
(45) Date of Patent: May 28, 2024

(54) WORKING FLUID COMPOSITION FOR REFRIGERATOR, AND REFRIGERATOR OIL

(71) Applicant: ENEOS Corporation, Tokyo (JP)

(72) Inventors: Satoshi Nagai, Tokyo (JP); Tatsuki Nakajima, Tokyo (JP); Yuya Mizutani, Tokyo (JP); Hidetoshi Ogata, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 212 days.

(21) Appl. No.: 17/621,847

(22) PCT Filed: Jun. 17, 2020

(86) PCT No.: PCT/JP2020/023823
§ 371 (c)(1),
(2) Date: Dec. 22, 2021

(87) PCT Pub. No.: WO2021/005986
PCT Pub. Date: Jan. 14, 2021

(65) Prior Publication Data
US 2022/0325159 A1   Oct. 13, 2022

(30) Foreign Application Priority Data
Jul. 5, 2019   (JP) ................. 2019-126493

(51) Int. Cl.
*C09K 5/04* (2006.01)
*C10M 105/38* (2006.01)
*C10M 105/46* (2006.01)
*C10N 40/30* (2006.01)

(52) U.S. Cl.
CPC ........... *C09K 5/044* (2013.01); *C10M 105/38* (2013.01); *C10M 105/46* (2013.01); *C09K 2205/12* (2013.01); *C09K 2205/24* (2013.01); *C10M 2207/2835* (2013.01); *C10M 2207/3045* (2013.01); *C10N 2040/30* (2013.01)

(58) Field of Classification Search
CPC ...... C09K 5/044; C09K 5/04; C09K 2205/24; C09K 2205/12; C10N 2020/101; C10N 2030/02; C10N 2030/70; C10N 2020/02; C10N 2040/30; C10M 105/46; C10M 171/008; C10M 105/38; C10M 2207/042; C10M 2207/2835; C10M 2207/3025; C10M 2207/2825; C10M 2207/3045; C10M 2207/026

See application file for complete search history.

(56) References Cited

U.S. PATENT DOCUMENTS

| | | | |
|---|---|---|---|
| 5,611,210 | A | 3/1997 | Nimitz et al. |
| 2005/0233933 | A1 | 10/2005 | Singh et al. |
| 2015/0184103 | A1 | 7/2015 | Saito et al. |
| 2017/0002291 | A1 | 1/2017 | Takahashi et al. |
| 2018/0215977 | A1 | 8/2018 | Okido et al. |
| 2019/0194567 | A1 | 1/2019 | Shono et al. |

FOREIGN PATENT DOCUMENTS

| | | | |
|---|---|---|---|
| CN | 1122606 | | 5/1996 |
| CN | 1969027 | | 5/2007 |
| CN | 103965987 | | 8/2014 |
| CN | 106414681 | | 2/2017 |
| CN | 107849475 | | 3/2018 |
| JP | H08-507524 | | 8/1996 |
| JP | 2008-504373 | | 2/2008 |
| JP | 2009-024152 | | 2/2009 |
| JP | 2011-195630 | | 10/2011 |
| JP | 2015-514827 | | 5/2015 |
| JP | 2017-031321 | | 2/2017 |
| WO | 94/020588 | | 9/1994 |
| WO | 2005/103189 | | 11/2005 |
| WO | 2013/138123 | | 9/2013 |
| WO | 2014/017596 | | 1/2014 |
| WO | 2015/111522 | | 7/2015 |
| WO | WO-2018052088 | A1 * | 3/2018 ............ C09K 5/04 |

OTHER PUBLICATIONS

ISR issued in International Patent Application No. PCT/JP2020/023823, Sep. 15, 2020, translation.
IPRP issued in International Patent Application No. PCT/JP2020/023823, Jan. 11, 2022, translation.

* cited by examiner

*Primary Examiner* — Vishal V Vasisth
(74) *Attorney, Agent, or Firm* — GREENBLUM & BERNSTEIN, P.L.C.

(57) ABSTRACT

A working fluid composition for a refrigerating machine, containing: a refrigerant containing trifluoroiodomethane; and a refrigerating machine oil containing a complex ester synthesized from a polyhydric alcohol, a polybasic acid, and at least one selected from a monohydric alcohol and a monocarboxylic fatty acid.

6 Claims, No Drawings

WORKING FLUID COMPOSITION FOR REFRIGERATOR, AND REFRIGERATOR OIL

This application is a 371 of PCT/JP2020/023823 filed Jun. 17, 2020.

TECHNICAL FIELD

The present invention relates to a working fluid composition for a refrigerating machine, and a refrigerating machine oil.

BACKGROUND ART

Refrigerating machines, such as refrigerators, car air conditioners, room air conditioners, vending machines, and the like, include a compressor for circulating a refrigerant through a refrigeration cycle. The compressor is filled with refrigerating machine oil for lubricating the sliding members. A refrigerating machine oil is generally required to have properties such as abrasion resistance and stability, and contains a lubricating base oil or various additives selected according to the required properties.

In recent years, as a refrigerant to be circulated in a refrigeration cycle, application of a nonflammable refrigerant having a low global warming potential (GWP) has been studied from the viewpoint of measures against global warming and safety. For example, Patent Document 1 discloses a refrigerant containing trifluoroiodomethane as a refrigerant in a refrigeration system.

CITATION LIST

Patent Document

[Patent Document 1] Japanese Unexamined Patent Publication No. 2015-514827

SUMMARY OF INVENTION

Technical Problem

In the case of the refrigerant circulation system as described above, a part of the refrigerating machine oil is discharged from the compressor together with the refrigerant due to the mechanism.

Therefore, the refrigerating machine oil is required to have compatibility with the refrigerant in addition to lubricity in the compressor (i.e., oil film retention in a lubricated portion in the presence of the refrigerant). That is, the refrigerating machine oil preferably has a low two layer separation temperature with the refrigerant from the viewpoint of ensuring compatibility with the refrigerant, and preferably has a high refrigerant dissolved viscosity from the viewpoint of ensuring oil film retention in the lubricated part.

However, it is not always easy to achieve both lubricity of the refrigerating machine oil and compatibility with the refrigerant. For example, when the refrigerating machine oil having high compatibility (low two layer separation temperature) with a refrigerant is use, dissolution of the refrigerant in the refrigerating machine oil may reduce the viscosity of the mixture of the refrigerant and the refrigerating machine oil (working fluid composition for a refrigerating machine oil), resulting in reduced oil film retention. In addition, when the refrigerant dissolved viscosity of the refrigerating machine oil is increased to secure lubricity, the two layer separation temperature is relatively increased, and thus compatibility with the refrigerant may be deteriorated.

The present invention has been made in view of such circumstances, and an object thereof is to provide a refrigerating machine oil having a low two layer separation temperature with a refrigerant and a high refrigerant dissolved viscosity; and a working fluid composition for a refrigerating machine containing the refrigerating machine oil.

Solution to Problem

As a result of intensive studies to solve the above problems, the present inventors have found that a refrigerating machine oil containing a complex ester can increase the refrigerant dissolved viscosity of a refrigerant containing trifluoroiodomethane without increasing the two layer separation temperature, thereby completing the present invention.

That is, the present invention provides a working fluid composition for a refrigerating machine comprising: a refrigerant comprising trifluoroiodomethane; and a refrigerating machine oil comprising a complex ester synthesized from a polyhydric alcohol, a polybasic acid, and at least one selected from a monohydric alcohol and a monocarboxylic fatty acid.

The refrigerating machine oil may further comprise a polyol ester.

The present invention also provides a refrigerating machine oil comprising a complex ester synthesized from a polyhydric alcohol, a polybasic acid, and at least one selected from a monohydric alcohol and a monocarboxylic fatly acid, and the refrigerating machine oil used together with a refrigerant comprising trifluoroiodomethane.

Advantageous Effects of Invention

According to the present invention, a refrigerating machine oil having a low two layer separation temperature with a refrigerant and a high refrigerant dissolved viscosity; and a working fluid composition for a refrigerating machine containing the refrigerating machine oil can be provided.

DESCRIPTION OF EMBODIMENTS

Embodiments of the present invention will now be described in detail.

The refrigerating machine oil according to the present embodiment contains a complex ester synthesized from a polyhydric alcohol, a polybasic acid, and at least one selected from a monohydric alcohol and a monocarboxylic fatty acid.

The complex ester is, for example, an ester synthesized by the following method (a) or (b):

(a) method in which a molar ratio of the polyhydric alcohol to the polybasic acid is adjusted to synthesize an ester intermediate in which a part of hydroxyl groups of the polyhydric alcohol remains without being esterified, and then the remaining hydroxyl groups are esterified with the monohydric alcohol;

(b) method in which a molar ratio of the polyhydric alcohol to the polybasic acid is adjusted to synthesize an ester intermediate in which a part of hydroxyl groups of the polyhydric alcohol remains without being esterified, and then the remaining hydroxyl groups are esterified with the monocarboxylic fatty acid.

The complex ester obtained by the method of (b) above generates relatively strong acid if hydrolyzed when used as the refrigerating machine oil, and thus tends to be slightly inferior in terms of stability to the complex ester obtained by the method (a). Therefore, the complex ester is preferably the complex ester obtained by the method (a) having higher stability.

The complex ester is preferably an ester synthesized from at least one selected from polyhydric alcohols having 2 to 4 hydroxyl groups, at least one selected from polybasic acids having 6 to 12 carbon atoms, and at least one selected from monohydric alcohols having 4 to 18 carbon atoms and monocarboxylic fatty acids having 2 to 12 carbon atoms.

Examples of the polyhydric alcohol having 2 to 4 hydroxyl groups include neopentyl glycol, trimethylolpropane, and pentaerythritol. The polyhydric alcohol having 2 to 4 hydroxyl groups is preferably selected from neopentyl glycol and trimethylolpropane from the viewpoint of securing suitable viscosity and obtaining good low-temperature characteristics when the complex ester is used as a base oil, and more preferably neopentyl glycol from the viewpoint of being able to widely adjust viscosity.

From the viewpoint of excellent lubricity, the polyhydric alcohol constituting the complex ester preferably further contains, in addition to the polyhydric alcohol having 2 to 4 hydroxyl groups, a dihydric alcohol having 2 to 10 carbon atoms other than neopentyl glycol. Examples of the dihydric alcohol having 2 to 10 carbon atoms other than neopentyl glycol include ethylene glycol, propanediol, butanediol, pentanediol, hexanediol, 2-methyl-1,3-propanediol, 3-methyl-1,5-pentanediol, and 2,2-diethyl-1,3-pentanediol. From the viewpoint of excellent properties of the lubricating base oil, the dihydric alcohol is preferably a butanediol. Examples of the butanediol include 1,2-butanediol, 1,3-butanediol, 1,4-butanediol, and 2,3-butanediol. The butanediol is preferably selected from 1,3-butanediol and 1,4-butanediol from the viewpoint of obtaining good characteristics. The amount of the dihydric alcohol having 2 to 10 carbon atoms other than neopentyl glycol is preferably 1.2 mol or less, more preferably 0.8 mol or less, and still more preferably 0.4 mol or less, with respect to 1 mol of the polyhydric alcohol having 2 to 4 hydroxyl groups.

Examples of the polybasic acid having 6 to 12 carbon atoms include adipic acid, pimelic acid, suberic acid, azelaic acid, sebacic acid, phthalic acid, and trimellitic acid. The polybasic acid is preferably selected from adipic acid and sebacic acid, more preferably adipic acid, from the viewpoint of excellent balance of properties of the synthesized ester and easy availability. The amount of the polybasic acid having 6 to 12 carbon atoms is preferably 0.3 to 5 mol, more preferably 0.4 to 4 mol, still more preferably 0.5 to 3 mol, particularly preferably 0.6 to 2.5 mol, with respect to 1 mol of the polyhydric alcohol having 2 to 4 hydroxyl groups.

Examples of the monohydric alcohol having 4 to 18 carbon atoms include aliphatic alcohols such as a butanol, a pentanol, a hexanol, a heptanol, an octanol, a nonanol, a decanol, a dodecanol, and an oleyl alcohol. These monohydric alcohols may be linear or branched. The monohydric alcohol having 4 to 18 carbon atoms is preferably a monohydric alcohol having 6 to 10 carbon atoms, more preferably a monohydric alcohol having 8 to 10 carbon atoms, from the viewpoint of balance of properties. The monohydric alcohol is more preferably selected from 2-ethylhexanol and 3,5,5-trimethylhexanol from the viewpoint of improving low-temperature properties of the synthesized complex ester.

Examples of the monocarboxylic fatty acid having 2 to 12 carbon atoms include ethanoic acid, a propanoic acid, a butanoic acid, a pentanoic acid, a hexanoic acid, a heptanoic acid, an octanoic acid, a nonanoic acid, a decanoic acid, and a dodecanoic acid. These monocarboxylic fatty acids may be linear or branched. The monocarboxylic fatty acid having 2 to 12 carbon atoms is preferably a monocarboxylic fatty acid having 8 to 10 carbon atoms, and more preferably 2-ethylhexanoic acid or 3,5,5-trimethylhexanoic acid from the viewpoint of low-temperature properties.

Preferable examples of the complex ester include the following complex esters:
a complex ester obtained by reacting adipic acid with neopentyl glycol and 1,4-butanediol to obtain an ester intermediate, further reacting 3,5,5-trimethylhexanol with the ester intermediate, and removing the remaining unreacted material by distillation;
a complex ester obtained by reacting adipic acid with trimethylolpropane to obtain an ester intermediate, further reacting 2-ethylhexanol with the ester intermediate, and removing the remaining unreacted material by distillation;
a complex ester obtained by reacting adipic acid with neopentyl glycol to obtain an ester intermediate, further reacting 3,5,5-trimethylhexanoic acid with the ester intermediate, and removing the remaining unreacted material by distillation;
a complex ester obtained by reacting sebacic acid with trimethylolpropane and 1,3-butanediol to obtain an ester intermediate, further reacting normal heptanol with the ester intermediate, and removing the remaining unreacted material by distillation; and
a complex ester obtained by reacting adipic acid with neopentyl glycol and 1,4-butanediol to obtain an ester intermediate, further reacting 2-ethylhexanol with the ester intermediate, and removing the remaining unreacted material by distillation.

Further, as the complex ester, the following complex esters having a high viscosity can also be used:
a complex ester synthesized from pentaerythritol, adipic acid, branched butanoic acid and branched nonanoic acid;
a complex ester synthesized from pentaerythritol, adipic acid, at least one selected from pentanoic acid and branched octanoic acid or pentanoic acid and branched nonanoic acid; and
a complex ester synthesized from pentaerythritol, adipic acid, branched pentanoic acid and branched octanoic acid.

The kinematic viscosity at 40° C. of the complex ester may be preferably 10 $mm^2/s$ or more, more preferably 40 $mm^2/s$ or more, and even more preferably 50 $mm^2/s$ or more. The kinematic viscosity at 40° C. of the complex ester may be preferably 1000 $mm^2/s$ or less, more preferably 500 $mm^2/s$ or less, still more preferably 400 $mm^2/s$ or less, particularly preferably 170 $mm^2/s$ or less. The kinematic viscosity at 100° C. of the complex ester may be preferably 1 $mm^2/s$ or more, more preferably 2 $mm^2/s$ or more. The kinematic viscosity at 100° C. of the complex ester may be preferably 100 $mm^2/s$ or less, more preferably 50 $mm^2/s$ or less. The viscosity index of the complex ester may be preferably 100 or more, more preferably 120 or more, and even more preferably 130 or more, and may be 200 or less or 160 or less, in order to obtain a refrigerating machine oil having good low-temperature viscosity characteristics.

The kinematic viscosity and the viscosity index in the present invention mean a kinematic viscosity and a viscosity index measured in accordance with JIS K2283:2000.

The acid value of the complex ester is usually 0.1 mgKOH/g or less, preferably 0.05 mgKOH/g or less, and more preferably 0.02 mgKOH/g or less, from the viewpoint of more excellent stability. The hydroxyl value of the complex ester is usually 0 to 100 mgKOH/g, but from the viewpoint of the balance between compatibility with a refrigerant containing trifluoroiodomethane, refrigerant dissolved viscosity and stability, is preferably 5 mgKOH/g or more, more preferably 10 mgKOH/g or more, even more preferably 20 mgKOH/g or more, and preferably 50 mgKOH/g or less, more preferably 40 mgKOH/g or less. The acid value in the present invention means an acid value measured in accordance with JIS K2501:2003, and the hydroxyl value in the present invention means a hydroxyl value measured in accordance with JIS K0070.

The refrigerating machine oil according to the present embodiment may contain only the complex ester as the lubricating base oil, but may contain a lubricating base oil other than the complex ester. The content of the complex ester in the lubricating base oil may be 5% by mass or more, 10% by mass or more, 20% by mass or more, or 30% by mass or more, and may be 100% by mass or less or 50% by mass or less, based on the total amount of the lubricating base oil.

As the lubricating base oil other than the complex ester, a hydrocarbon oil, an oxygen-containing oil other than the complex ester, or the like can be used. Examples of the hydrocarbon oil include mineral hydrocarbon oils and synthetic hydrocarbon oils. Examples of the oxygen-containing oil other than the complex ester include esters other than the complex ester, ethers, carbonates, ketones, silicones, and polysiloxanes.

The mineral hydrocarbon oil can be obtained by purifying a lubricating oil fraction obtained by atmospheric distillation and vacuum distillation of a paraffinic or naphthenic crude oil by a method such as solvent deasphalting, solvent refining, hydrorefining, hydrocracking, solvent dewaxing, hydrodewaxing, clay treatment, or sulfuric acid washing. One of these purification methods may be used alone, or two or more of them may be used in combination.

Examples of the synthetic hydrocarbon oil include an alkylbenzene, an alkylnaphthalene, a poly-α-olefin (PAO), a polybutene, and an ethylene-α-olefin copolymer.

Examples of the ester other than the complex ester include a polyol ester, an aromatic ester, a dibasic acid ester, a carbonate ester, and a mixture of two or more thereof.

Examples of ethers include a polyvinyl ether, a polyalkylene glycol, a polyphenyl ether, a perfluoroether, and mixtures thereof.

Among these lubricating base oils, it is preferable that the lubricating base oil further contains a polyol ester from the viewpoint of viscosity characteristics, lubricity, electrical insulation properties, and the like.

The polyol ester is an ester of a polyhydric alcohol and a fatty acid. As the fatty acid, a saturated fatty acid is preferably used. The number of carbon atoms of the fatty acid is preferably 4 to 20, more preferably 4 to 18, still more preferably 4 to 9, particularly preferably 5 to 9, and extremely preferably 8 to 9. The polyol ester may be a partial ester in which some of the hydroxyl groups of the polyhydric alcohol are not esterified and remain as hydroxyl groups, may be a complete ester in which all of the hydroxyl groups are esterified, or may be a mixture of the partial ester and the complete ester.

In addition, among the fatty acids constituting the polyol ester, specific examples of the fatty acid having the above-described preferable number of carbon atoms (that is, a fatty acid having 4 to 20 carbon atoms) include a butanoic acid, a pentanoic acid, a hexanoic acid, a heptanoic acid, an octanoic acid, a nonanoic acid, a decanoic acid, an undecanoic acid, a dodecanoic acid, a tridecanoic acid, a tetradecanoic acid, a pentadecanoic acid, a hexadecanoic acid, a heptadecanoic acid, an octadecanoic acid, a nonadecanoic acid, and an icosanoic acid. These fatty acids may be linear or branched. The fatty acid is preferably a fatty acid having a branch at the α-position and/or the β-position, and is more preferably selected from 2-methylpropanoic acid, 2-methylbutanoic acid, 2-methylpentanoic acid, 2-methylhexanoic acid, 2-ethylpentanoic acid, 2-methylheptanoic acid, 2-ethylhexanoic acid, 3,5,5-trimethylhexanoic acid and 2-ethylhexadecanoic acid, and is still more preferably selected from 2-ethylhexanoic acid and 3,5,5-trimethylhexanoic acid.

Among the fatty acids constituting the polyol ester, the proportion of the fatty acid having the above-described preferred number of carbon atoms is preferably 20 to 100% by mole, more preferably 50 to 100% by mole, still more preferably 60 to 100% by mole, particularly preferably 70 to 100% by mole, and extremely preferably 90 to 100% by mole. In particular, when a fatty acid having 9 carbon atoms is contained as the fatty acid constituting the polyol ester, the proportion of the fatty acid is preferably 30% by mole or more, more preferably 40% by mole or more, and is preferably 100% by mole or less, more preferably 90% by mole or less, still more preferably 80% by mole or less.

The fatty acid may contain a fatty acid other than a fatty acid having 4 to 20 carbon atoms. The fatty acid other than the fatty acid having 4 to 20 carbon atoms may be, for example, a fatty acid having 21 to 24 carbon atoms. The fatty acid having 21 to 24 carbon atoms may be, for example, heneicosanoic acid, docosanoic acid, tricosanoic acid, or tetracosanoic acid, and may be linear or branched.

As the polyhydric alcohol constituting the polyol ester, a polyhydric alcohol having 2 to 6 hydroxyl groups is preferably used. The number of carbon atoms of the polyhydric alcohol is preferably 4 to 12, and more preferably 5 to 10. The polyhydric alcohol is preferably a hindered alcohol such as neopentyl glycol, trimethylolethane, trimethylolpropane, trimethylolbutane, di-(trimethylolpropane), tri (trimethylolpropane), pentaerythritol, or dipentaerythritol, and more preferably pentaerythritol, dipentaerythritol, or a mixed alcohol of pentaerythritol and dipentaerythritol because of particularly excellent compatibility with a refrigerant and hydrolysis stability.

The kinematic viscosity at 40° C. of the lubricating base oil may be preferably 3 mm$^2$/s or more, more preferably 4 mm$^2$/s or more, and still more preferably 5 mm$^2$/s or more. The kinematic viscosity at 40° C. of the lubricating base oil may be preferably 1000 mm$^2$/s or less, more preferably 500 mm$^2$/s or less, and still more preferably 400 mm$^2$/s or less. The kinematic viscosity at 100° C. of the lubricating base oil may be preferably 1 mm$^2$/s or more, more preferably 2 mm$^2$/s or more. The kinematic viscosity at 100° C. of the lubricating base oil may be preferably 100 mm$^2$/s or less, more preferably 50 mm$^2$/s or less.

The viscosity index of the lubricant base oil may be 70 or more and may be 200 or less.

The content of the lubricating base oil may be 50% by mass or more, 60% by mass or more, 70% by mass or more, 80% by mass or more, or 90% by mass or more, based on the total amount of the refrigerating machine oil.

The refrigerating machine oil according to the present embodiment preferably further contains an antioxidant and/or an acid scavenger.

The antioxidant may be, for example, a phenolic antioxidant such as 2,6-di-tert-butyl-p-cresol or bisphenol A, or an amine antioxidant such as phenyl-α-naphthylamine or N,N-di(2-naphthyl)-p-phenylenediamine, and is preferably 2,6-di-tert.-butyl-p-cresol. The content of the antioxidant may be preferably 0.01% by mass or more, more preferably 0.05% by mass or more, and still more preferably 0.1% by mass or more, based on the total amount of the refrigerating machine oil, from the viewpoint of excellent stability of the refrigerating machine oil. The content of the antioxidant is not particularly limited, and is usually 5% by mass or less, and may be preferably 0.5% by mass or less, more preferably 0.3% by mass or less, and still more preferably 0.2% by mass or less, based on the total amount of the refrigerating machine oil, from the viewpoint of suppressing coloring of the refrigerating machine oil due to the antioxidant at the time of aeration.

Examples of the acid scavenger include epoxy compounds (epoxy-based acid scavengers). Examples of the epoxy compound include glycidyl ether type epoxy compounds, glycidyl ester type epoxy compounds, aryloxirane compounds, alkyloxirane compounds, cycloaliphatic epoxy compounds, epoxidized fatty acid monoesters, and epoxidized vegetable oils. These acid scavengers can be used alone as one species or in combination of two or more species.

As the glycidyl ether type epoxy compound, for example, an aryl glycidyl ether type epoxy compound or an alkyl glycidyl ether type epoxy compound represented by the following formula (1) can be used.

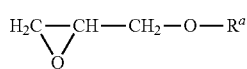  (1)

In the formula (1), $R^a$ represents an aryl group or an alkyl group having 5 to 18 carbon atoms.

The glycidyl ether type epoxy compound represented by the formula (1) is preferably phenyl glycidyl ether, n-butylphenyl glycidyl ether, i-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether, decylphenyl glycidyl ether, decyl glycidyl ether, undecyl glycidyl ether, dodecyl glycidyl ether, tridecyl glycidyl ether, tetradecyl glycidyl ether, or 2-ethylhexyl glycidyl ether.

When the number of carbon atoms of the alkyl group represented by $R^a$ is 5 or more, the stability of the epoxy compound is ensured, and it is possible to suppress decomposition before reacting with moisture, a fatty acid, or an oxidation-degraded product, or to suppress self-polymerization in which epoxy compounds are polymerized with each other, and thus it is easy to obtain a target function. On the other hand, when the number of carbon atoms of the alkyl group represented by $R^a$ is 18 or less, the solubility with the refrigerant is kept good, and it is possible to make it difficult to cause defects such as poor cooling due to precipitation in the refrigeration apparatus.

As the glycidyl ether type epoxy compound, in addition to the epoxy compound represented by the formula (1), neopentyl glycol diglycidyl ether, trimethylolpropane triglycidyl ether, pentaerythritol tetraglycidyl ether, 1,6-hexanediol diglycidyl ether, sorbitol polyglycidyl ether, polyalkylene glycol monoglycidyl ether, polyalkylene glycol diglycidyl ether, and the like can also be used.

As the glycidyl ester type epoxy compound, for example, a compound represented by the following formula (2) can be used.

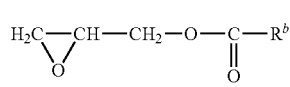  (2)

In the formula (2), $R^b$ represents an aryl group, an alkyl group having 5 to 18 carbon atoms, or an alkenyl group.

As the glycidyl ester type epoxy compound represented by the formula (2), glycidyl benzoate, glycidyl neodecanoate, glycidyl-2,2-dimethyloctanoate, glycidyl acrylate, and glycidyl methacrylate are preferable.

When the number of carbon atoms of the alkyl group represented by $R^b$ is 5 or more, the stability of the epoxy compound is ensured, and it is possible to suppress decomposition before reacting with moisture, a fatty acid, or an oxidation-degraded product, or to suppress self-polymerization in which epoxy compounds are polymerized with each other, and it is easy to obtain a target function. On the other hand, when the number of carbon atoms of the alkyl group or the alkenyl group represented by $R^b$ is 18 or less, the solubility with the refrigerant is favorably maintained, and defects such as poor cooling due to precipitation in the refrigerating machine can be made less likely to occur.

The cycloaliphatic epoxy compound is a compound having a partial structure represented by the following general formula (3) in which carbon atoms constituting an epoxy group directly constitutes a cycloaliphatic ring.

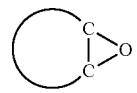  (3)

Preferred examples of the cycloaliphatic epoxy compound include 1,2-epoxycyclohexane, 1,2-epoxycyclopentane, 3 epoxycyclohexylmethyl-3,4-epoxycyclohexanecarboxylate, bis(3,4-epoxycyclohexylmethyl) adipate, exo-2,3-epoxynorbornane, bis(3,4-epoxy-6-methylcyclohexylmethyl) adipate, 2-(7-oxabicyclo[4.1.0]hept-2-yl)-spiro (1,3-dioxane-5,3'-[7]oxabicyclo[4.1.0]heptane, 4-(1 methyl-epoxyethyl)-1,2-epoxy-2-methylcyclohexane, and 4-epoxyethyl-1,2-epoxycyclohexane.

Examples of the aryloxirane compound include 1,2-epoxystyrene and alkyl-1,2-epoxystyrene.

Examples of the alkyloxirane compound include 1,2-epoxybutane, 1,2-epoxypentane, 1,2-epoxyhexane, 1,2-epoxyheptane, 1,2-epoxyoctane, 1,2-epoxynonane, 1,2-epoxydecane, epoxyundecane, 1,2-epoxydodecane, 1,2-epoxytridecane, 1,2-epoxytetradecane, 1,2-epoxypentadecane, 2-epoxyhexadecane, 2-epoxyheptadecane, 1,1,2-epoxyoctadecane, 2-epoxynonadecane, and 1,2-epoxyicosane.

Examples of the epoxidized fatty acid monoester include esters of an epoxidized fatty acid having 12 to 20 carbon atoms and an alcohol, phenol or alkylphenol having 1 to 8 carbon atoms. As the epoxidized fatty acid monoester, butyl, hexyl, benzyl, cyclohexyl, methoxyethyl, octyl, phenyl and butylphenyl esters of epoxystearic acid are preferably used.

Examples of epoxidized vegetable oils include epoxy compounds of vegetable oils such as soybean oil, linseed oil and cottonseed oil.

The acid scavenger is preferably at least one selected from glycidyl ester type epoxy compounds and glycidyl ether type epoxy compounds, and is preferably at least one selected from glycidyl ester type epoxy compounds from the viewpoint of excellent compatibility with resin materials used for members in a refrigerating machine.

The content of the acid scavenger is preferably 0.01 to 5% by mass, more preferably 0.1 to 3% by mass, and still more preferably 0.3 to 2% by mass, based on the total amount of the refrigerating machine oil.

When the refrigerating machine oil according to the present embodiment contains the antioxidant and the acid scavenger, the total content of the antioxidant and the acid scavenger in the refrigerating machine oil is preferably 0.02% by mass or more, more preferably 0.15% by mass or more, still more preferably 03% by mass or more, and preferably 10% by mass or less, more preferably 5% by mass or less, still more preferably 2% by mass or less, based on the total amount of the refrigerating machine oil.

The refrigerating machine oil according to the present embodiment may further contain other additives. Examples of other additives include extreme pressure agents, oiliness agents, antifoaming agents, metal deactivators, antiwear agents, viscosity index improvers, pour point depressants, and detergent dispersants. The content of these additives may be 10% by mass or less or 5% by mass or less based on the total amount of the refrigerating machine oil.

The kinematic viscosity at 40° C. of the refrigerating machine oil may be preferably 3 mm$^2$/s or more, more preferably 4 mm$^2$/s or more, still more preferably 5 mm$^2$/s or more. The kinematic viscosity at 40° C. of the refrigerating machine oil may be preferably 500 mm$^2$/s or less, more preferably 400 mm$^2$/s or less, still more preferably 300 mm$^2$/s or less. The kinematic viscosity at 100° C. of the refrigerating machine oil may be preferably 1 mm$^2$/s or more, more preferably 2 mm$^2$/s or more.

The kinematic viscosity at 100° C. of the refrigerating machine oil may be preferably 100 mm$^2$/s or less, more preferably 50 mm$^2$/s or less.

The viscosity index of the refrigerating machine oil may be 70 or more, and may be 200 or less.

The pour point of the refrigerating machine oil may preferably be −10° C. or less, more preferably −20° C. or less. The pour point in the present invention means a pour point measured in accordance with JIS K2269:1987.

The volume resistivity of the refrigerating machine oil may be preferably $1.0 \times 10^9$ Ω·m or more, more preferably $1.0 \times 10^{10}$ Ω·m or more, and still more preferably $1.0 \times 10^{11}$ Ω·m or more. The volume resistivity in the present invention means a volume resistivity at 25° C. measured in accordance with JIS C2101:1999.

The moisture content of the refrigerating machine oil may be preferably 200 ppm or less, more preferably 100 ppm or less, and even more preferably 50 ppm or less, based on the total amount of the refrigerating machine oil.

The acid value of the refrigerating machine oil may preferably be 1.0 mgKOH/g or less, more preferably 0.1 mgKOH/g or less. The hydroxyl value of the refrigerating machine oil is usually 0 to 100 mgKOH/g, preferably 50 mgKOH/g or less, more preferably 20 mgKOH/g or less, preferably 2 mgKOH/g or more, more preferably 6 mgKOH/g or more.

The ash content of the refrigerating machine oil may preferably be 100 ppm or less, more preferably 50 ppm or less. The ash content in the present invention means an ash content measured in accordance with JIS K2272:1998.

The refrigerating machine oil according to this embodiment is usually present in a refrigerating machine and mixed with a refrigerant containing trifluoroiodomethane as a working fluid composition for a refrigerating machine. That is, the refrigerating machine oil according to the present embodiment is used together with the refrigerant containing trifluoroiodomethane, and the working fluid composition for a refrigerating machine according to the present embodiment contains the refrigerating machine oil according to the present embodiment and the refrigerant containing trifluoroiodomethane.

The refrigerant is not particularly limited as long as it contains trifluoroiodomethane, and may contain only trifluoroiodomethane or may further contain a refrigerant other than trifluoroiodomethane. The content of trifluoroiodomethane is preferably 10% by mass or more, more preferably 20% by mass or more, still more preferably 30% by mass or more, based on the total amount of the refrigerant. The content of trifluoroiodomethane is preferably 100% by mass or less, more preferably 50% by mass or less, still more preferably 40% by mass or less, based on the total amount of the refrigerant.

Examples of the refrigerant other than trifluoroiodomethane include a saturated hydro fluorocarbon refrigerant, an unsaturated hydrofluorocarbon refrigerant, a hydrocarbon refrigerant, a fluorine-containing ether refrigerant such as perfluoroethers, a bis(trifluoromethyl)sulfide refrigerant, a natural refrigerant such as ammonia and carbon dioxide, and a mixed refrigerant of two or more selected from these refrigerants.

Examples of the saturated hydrofluorocarbon refrigerant include a saturated hydrofluorocarbon having preferably 1 to 3 carbon atoms, more preferably 1 to 2 carbon atoms. Specific examples include difluoromethane (R32), fluoromethane (R23), pentafluoroethane (R125), 1,1,2,2-tetrafluoroethane (R134), 1,1,1,2-tetrafluoroethane (R134a), 1,1,1-trifluoroethane (R143a), 1,1-difluoroethane (R152a), fluoroethane (R161), 1,1,1,2,3,3,3-heptafluoropropane (R227ea), 1,1,1,2,3,3-hexafluoropropane (R236ea), 1,1,1,3,3,3-hexafluoropropane (R236fa), 1,1,1,3,3-pentafluoropropane (R245fa), and 1,1,1,3,3-pentafluorobutane (R365mfc), or a mixture of two or more thereof.

The saturated hydrofluorocarbon refrigerant is appropriately selected from the above depending on the application and the required performance. Preferable examples include R32 alone; R23 alone; R134a alone; 8125 alone; a mixture of R134a/R32 of 60 to 80% by mass/40 to 20% by mass; a mixture of R32/R125 of 40 to 70% by mass/60 to 30% by mass; a mixture of R125/R143a of 40 to 60% by mass/60 to 40% by mass; a mixture of R134a/R32/R1.25 of 60% by mass/30% by mass/10% by mass; a mixture of R1.34a/R32/R125 of 40 to 70% by mass/15 to 35% by mass/5 to 40% by mass; and a mixture of R1.25/R134a/R1.43a of 35 to 55% by mass/1 to 15% by mass/40 to 60% by mass. More specifically, a mixture of R134a/R32 of 70/30% by mass; a mixture of 1132/R1.25 of 60/40% by mass; a mixture of R32/R125 of 50/50% by mass (R410A); a mixture of R32/R125 of 45/55% by mass (R410B); a mixture of R125/R143a of 50/50% by mass (R507C); a mixture of R32/R125/R134a of 30/10/60% by mass; a mixture of R32/R125/R134a of 23/25/52% by mass (R407C); a mixture of R32/R125/R134a of 25/15/60% by mass (R407E); and a mixture of R125/R134a/R143a of 44/4/52% by mass (R404A).

Preferable examples of the mixed refrigerant of trifluoroiodomethane and the saturated hydrofluorocarbon refrigerant include an R32/R125/trifluoroiodomethane mixed refrigerant and an R32/R410A/trifluoroiodomethane mixed refrigerant. The ratio of R32 trifluoroiodomethane in such a mixed refrigerant is preferably 2 to 90:90 to 10, more preferably 10 to 70:70 to 30, still more preferably 30 to 60:60 to 40, and particularly preferably 40 to 60:50 to 40, from the viewpoint of compatibility with refrigerating machine oil, low GWP, and incombustibility. Similarly, the ratio of the mixed refrigerant of R32 and trifluoroiodomethane:R125 is preferably 10 to 95:90 to 5, more preferably 50 to 95:50 to 5, and still more preferably 80 to 95:20 to 5.

The unsaturated hydrofluorocarbon (HFO) refrigerant is preferably a fluoropropene, more preferably a fluoropropene having 3 to 5 fluorine atoms. Specifically; any one of 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243zf), or a mixture of two or more thereof are preferable. One or two or more selected from HFO-1225ye, HFO-1234ze and HFO-1234yf are preferable from the viewpoint of the physical properties of the refrigerant.

The hydrocarbon refrigerant is preferably a hydrocarbon having 1 to 5 carbon atoms, more preferably a hydrocarbon having 2 to 4 carbon atoms. Specific examples of the hydrocarbon include methane, ethylene, ethane, propylene, propane (R290), cyclopropane, normal butane, isobutane, cyclobutane, methylcyclopropane, 2-methylbutane, normal pentane, and a mixture of two or more thereof. Among them, those which are gaseous at 25° C. and 1 atm are preferably used, and propane, normal butane, isobutane, 2-methylbutane or a mixture thereof is preferably used.

The content of the refrigerating machine oil in the working fluid composition for a refrigerating machine may be preferably from 1 to 500 parts by mass, more preferably from 2 to 400 parts by mass, based on 100 parts by mass of the refrigerant.

The refrigerant dissolved viscosity (mm$^2$/s) of the working fluid composition for a refrigerating machine according to the present embodiment is measured by placing 100 g of the refrigerating machine oil in a 200 ml pressure-resistant container in which a vibration viscometer is placed, vacuum-deaerating the container, placing a refrigerant therein to prepare a working fluid composition for a refrigerating machine, and adjusting the pressure of the refrigerant and the temperature of the pressure-resistant container to a temperature of 80° C. and an absolute pressure of 3.4 MPa. The refrigerant dissolved viscosity under these conditions is preferably 2.3 mm$^2$/s or more, more preferably 2.5 mm$^2$/s or more, and even more preferably 2.7 mm$^2$/s or more, in order to maintain appropriate viscosity and oil film thickness even when the refrigerating machine oil is compatible with the refrigerant, and the upper limit thereof is not particularly limited, but is usually 3.5 mm$^2$/s or less.

The two layer separation temperature on the low temperature side of the working fluid composition for a refrigerating machine according to the present embodiment is measured in accordance with "Test Method for Compatibility with Refrigerant" of JIS K2211:2009 "Refrigerating machine oils". The two layer separation temperature is preferably 0° C. or lower, more preferably −10° C. or lower, still more preferably −20° C. or lower, particularly preferably −30° C. or lower in the case of a mixture of the refrigerant and the refrigerating machine oil in the proportion of the refrigerating machine oil in the mixture of 20% by mass, and is preferably −50° C. or higher, more preferably −40° C. or higher in view of the balance with the refrigerant dissolved viscosity.

The refrigerating machine oil and the working fluid composition for a refrigerating machine according to the present embodiment are suitably used for an air conditioner having a reciprocating or rotary hermetic compressor, a refrigerator, an open or hermetic car air conditioner, a dehumidifier, a water heater, a freezer, a freezing and refrigerating warehouse, an automatic vending machine, a showcase, a refrigerating machine such as a chemical plant, and a refrigerating machine having a centrifugal compressor.

EXAMPLES

Hereinafter, the present invention will be described more specifically based on Examples, but the present invention is not limited to the following Examples.

(Lubricating Base Oil)

Lubricating base oils having the composition (% by mass based on the total amount of the lubricating base oil) shown in Table 1 were prepared using the base materials shown below.

(Base Materials)

Base material 1: polyol ester of pentaerythritol and mixed fatty acids of 2-ethylhexanoic acid/3,5,5-trimethylhexanoic acid (molar ratio: 50/50) (kinematic viscosity at 40° C.: 68.3 mm$^2$/s, viscosity index: 88, acid value: 0.01 mgKOH/g, hydroxyl value: 1 mg KOH/g)

Base material 2: polyol ester of pentaerythritol and mixed fatty acids of 2-methylpropanoic acid/3,5,5-trimethylhexanoic acid (molar ratio: 35/65) (kinematic viscosity at 40° C.: 69.4 mm$^2$/s, viscosity index: 95, acid value: 0.01 mg KOH/g, hydroxyl value: 1 mg KOH/g)

Base material 3: complex ester obtained by reacting adipic acid (1.9 mol) with neopentyl glycol (1.0 mol) and 1,4-butanediol (0.2 mol) to obtain an ester intermediate, further reacting 3,5,5-trimethylhexanol (1.0 mol) with the ester intermediate, and removing the remaining unreacted material by distillation (kinematic viscosity at 40° C.: 150.0 mm$^2$/s, viscosity index: 138, acid value: 0.02 mgKOH/g, hydroxyl value: 30 mgKOH/g)

The synthesis reaction of these base oils was performed without using a catalyst and a solvent, and a trace amount of impurities was removed by adsorption treatment (clay treatment) in the final step to have an acid value of 0.05 mgKOH/g or less. The kinematic viscosity and the viscosity index were measured and calculated in accordance with JIS K2283.

TABLE 1

| Base material | Lubricating base oil 1 | Lubricating base oil 2 | Lubricating base oil 3 | Lubricating base oil 4 | Lubricating base oil 5 | Lubricating base oil 6 |
|---|---|---|---|---|---|---|
| 1 | 100 | — | 40 | 85 | 70 | 60 |
| 2 | — | 100 | 60 | — | — | — |
| 3 | — | — | — | 15 | 30 | 40 |

(Refrigerating Machine Oil)

Refrigerating machine oils 1 to 6 were prepared by adding 0.1% by mass of an antioxidant (DBPC) and 0.5% by mass of an acid scavenger (glycidyl neodecanoate), based on the total amount of the refrigerating machine oils, to the lubricating base oils 1 to 6 obtained above.

(Refrigerant)

The following refrigerants were prepared.

Refrigerant 1: difluoromethane (R32)

Refrigerant 2: mixture of difluoromethane (R32)/pentafluoroethane (R125) of 50/50% by mass (R410A)

Refrigerant 3: mixed refrigerant containing R32/R125 and trifluoroiodomethane (mixture ratio (mass ratio): R32/R410A/trifluoroiodomethane=37.5/23/39.5, i.e., R32/R125/trifluoroiodomethane=49.0/11.5/39.5) which is prepared by mixing the above refrigerants 1 and 2 and trifluoroiodomethane. The mixed refrigerant having this composition has a GWP of 733 and is considered to be a nonflammable refrigerant (A1) in the category of the ASHRAE.

The evaluations were performed according to the following test items using the above-mentioned refrigerating machine oils 1 to 6 and refrigerants 1 to 3.

(Measurement of Two Layer Separation Temperature)

According to "Compatibility test method with refrigerant" of JIS K2211:2009 "Refrigerating machine oil", a mixture of the refrigerant and the refrigerating machine oil (ratio of the refrigerating machine oil in the mixture of 20% by mass) was gradually cooled from 20° C. to −40° C., and a temperature at which the mixture was separated into two layers or clouded was evaluated as the two layer separation temperature (° C.). The results are shown in Tables 2 and 3. In Tables 2 and 3, "<−40" indicates that no layer separation and no cloud were observed in the measurement temperature range of this test. In addition, in Tables 2 and 3, "separation" means that layer separation or cloud has already occurred at 20'C.

(Measurement of Refrigerant Dissolved Viscosity)

The refrigerant dissolved viscosity (mm²/s) was measured by placing 100 g of refrigerating machine oil in a 200 ml pressure vessel containing a vibration viscometer, vacuum-degassing the vessel, adding a refrigerant to prepare a working fluid composition, and adjusting the pressure of the refrigerant and the temperature of the pressure vessel to a temperature of 80° C. and an absolute pressure of 3.4 MPa. The results are shown in Tables 2 and 3.

TABLE 3

|  | Comparative Example 4 | Comparative Example 5 | Comparative Example 6 | Comparative Example 7 |
| --- | --- | --- | --- | --- |
| Refrigerating machine oil | 1 | 1 | 5 | 3 |
| Refrigerant | 2 | 1 | 1 | 1 |
| Two layer separation temperature (° C.) | 11 | >20 | >20 | 6 |
| Refrigerant dissolved viscosity (mm²/s) | 3.0 | >3.0 | >3.0 | 2.8 |

As shown in Tables 2 and 3, when the refrigerating machine oil and the refrigerant according to the present invention were used, the refrigerant dissolved viscosity could be increased while the two layer separation temperature with the refrigerant was kept low, and both the refrigerant compatibility and the oil film retention could be achieved at a high level. On the other hand, in the case where the refrigerating machine oil or refrigerant according to the present invention was not used, it was shown that the refrigerant dissolved viscosity was significantly lowered when the two layer separation temperature was lowered, and conversely, the two layer separation temperature was significantly increased when the refrigerant dissolved viscosity was increased, and it was found that both the refrigerant compatibility and the oil film retention could not be achieved at a high level.

Examples 4 to 9

In Examples 4 to 9, refrigerating machine oils were prepared in the same manner as in Example 1 except that complex esters of the following base materials A-1 to A-6 were used instead of the complex ester of the base material 3 contained in the lubricating base oil 4.

(Base material A-1) ester obtained by reacting adipic acid (2.4 mol) with trimethylolpropane (1 mol) to obtain an ester intermediate, further reacting 2-ethylhexanol (2.0 mol) with the ester intermediate, and removing the remaining unreacted material by distillation (kinematic viscosity at 40° C.: 68.8 mm²/s, viscosity index: 120)

(Base material A-2) ester obtained by reacting adipic acid (0.8 mol) with neopentyl glycol (1 mol) to obtain an ester intermediate, further reacting 3,5,5-trimethylhexanoic acid (0.5 mol) with the ester intermediate, and removing the remaining unreacted material by distillation (kinematic viscosity at 40° C.: 71.5 mm²/s, viscosity index: 114)

(Base material A-3) ester obtained by reacting sebacic acid (2.4 mol) with trimethylolpropane (1 mol) and 1,3-butanediol (0.2 mol) to obtain an ester intermediate, further

TABLE 2

|  | Example 1 | Example 2 | Example 3 | Comparative Example 1 | Comparative Example 2 | Comparative Example 3 |
| --- | --- | --- | --- | --- | --- | --- |
| Refrigerating machine oil | 4 | 5 | 6 | 1 | 2 | 3 |
| Refrigerant | 3 | 3 | 3 | 3 | 3 | 3 |
| Two layer separation temperature (° C.) | −32 | −35 | −36 | −29 | <−40 | <−40 |
| Refrigerant dissolved viscosity (mm²/s) | 2.5 | 2.8 | 2.9 | 2.2 | <1.5 | 1.9 | reacting normal heptanal (1.6 mol) with the ester intermediate, and removing the remaining unreacted material by distillation (kinematic viscosity at 40° C.: 77.3 mm$^2$/s, viscosity index: 148)

(Base material A-4) ester obtained by reacting adipic acid (2.4 mol) with neopentyl glycol (1 mol) and 1,4-butanediol (0.3 mol) to obtain an ester intermediate, further reacting 2-ethylhexanol (2.4 mol) with the ester intermediate, and removing the remaining unreacted material by distillation. (kinematic viscosity at 40° C.: 68.2 mm$^2$/s, viscosity index: 144)

(Base material. A-5) ester obtained by reacting adipic acid (3.1 mol) with neopentyl glycol (1 mol) and 1,4-butanediol (0.4 mol) to obtain an ester intermediate, further reacting 3,5,5-trimethylhexanol (3.5 mol) with the ester intermediate, and removing the remaining unreacted material by distillation (kinematic viscosity at 40° C.: 32.2 mm$^2$/s, viscosity index: 161)

(Base material A-6) ester obtained by reacting adipic acid (2.4 mol) with neopentyl glycol (1 mol) and 1,4-butanediol (0.3 mol) to obtain an ester intermediate, further reacting 3,5,5-trimethylhexanol (2.5 mol) with the ester intermediate, and removing the remaining unreacted material by distillation (kinematic viscosity at 40° C.: 67.8 mm$^2$/s, viscosity index: 145)

For the refrigerating machine oils of Examples 4 to 9, the two layer separation temperature and the refrigerant dissolved viscosity, were measured in the same manner as described above. It was observed that the two layer separation temperature was low (−39° C. or lower) and the refrigerant dissolved viscosity was high (1.9 mm$^2$/s or higher) with the refrigerant 3 containing trifluoroiodomethane.

The invention claimed is:

1. A working fluid composition for a refrigerating machine, comprising:
   a refrigerant comprising trifluoroiodomethane difluoromethane (R32), and pentafluoroethane (R125), wherein a content of the trifluoroiodomethane is 30% by mass or more and 50% by mass or less based on the total amount of the refrigerant; and
   a refrigerating machine oil comprising a complex ester synthesized from
      a polyhydric alcohol selected from neopentyl glycol and trimethylolpropane,
      a polybasic acid selected from adipic acid and sebacic acid, and
      at least one selected from
         a monohydric alcohol having 8 to 10 carbon atoms, and
         a monocarboxylic fatty acid having 8 to 10 carbon atoms;
   wherein the refrigerating machine oil further comprises a polyol ester of a polyhydric alcohol and a fatty acid, wherein the polyhydric alcohol is pentaerythritol, dipentaerythritol, or a mixed alcohol of pentaerythritol and dipentaerythritol, and wherein the fatty acid is a saturated fatty acid having 4 to 9 carbon atoms, and
   wherein a content of the complex ester is 15% by mass or more, and a content of the polyol ester is 60% by mass or more based on the total amount of the refrigerating machine oil.

2. The working fluid composition for a refrigerating machine according to claim 1, wherein the refrigerating machine oil further comprises an antioxidant and an acid scavenger.

3. A refrigerating machine oil comprising
   a complex ester synthesized from
      a polyhydric alcohol selected from neopentyl glycol and trimethylolpropane,
      a polybasic acid selected from adipic acid and sebacic acid, and
      at least one selected from
         a monohydric alcohol having 8 to 10 carbon atoms and
         a monocarboxylic fatty acid having 8 to 10 carbon atoms,
   and the refrigerating machine oil used together with a refrigerant comprising trifluoroiodomethane difluoromethane (R32), and pentafluoroethane (R125) wherein a content of the trifluoroiodomethane is 30% by mass or more and 50% by mass or less based on the total amount of the refrigerant,
   wherein the refrigerating machine oil further comprises a polyol ester of a polyol ester a polyhydric alcohol and a fatty acid, wherein the polyhydric alcohol is pentaerythritol, dipentaerythritol, or a mixed alcohol of pentaerythritol and dipentaerythritol, and wherein the fatty acid is a saturated fatty acid having 4 to 9 carbon atoms, and
   wherein a content of the complex ester is 15% by mass or more, and a content of the polyol ester is 60% by mass or more based on the total amount of the refrigerating machine oil.

4. The refrigerating machine oil according to claim 3, further comprising an antioxidant and an acid scavenger.

5. The working fluid composition for a refrigerating machine according to claim 1, the refrigerant comprising trifluoroiodomethane, difluoromethane (R32), and pentafluoroethane (R125), wherein a mass ratio of R32 and trifluoroiodomethane:R125 is 80 to 95:20 to 5.

6. The refrigerating machine oil according to claim 3, the refrigerant comprising trifluoroiodomethane, difluoromethane (R32), and pentafluoroethane (R125), wherein a mass ratio of R32 and trifluoroiodomethane:R125 is 80 to 95:20 to 5.

* * * * *